Patented Dec. 25, 1923.

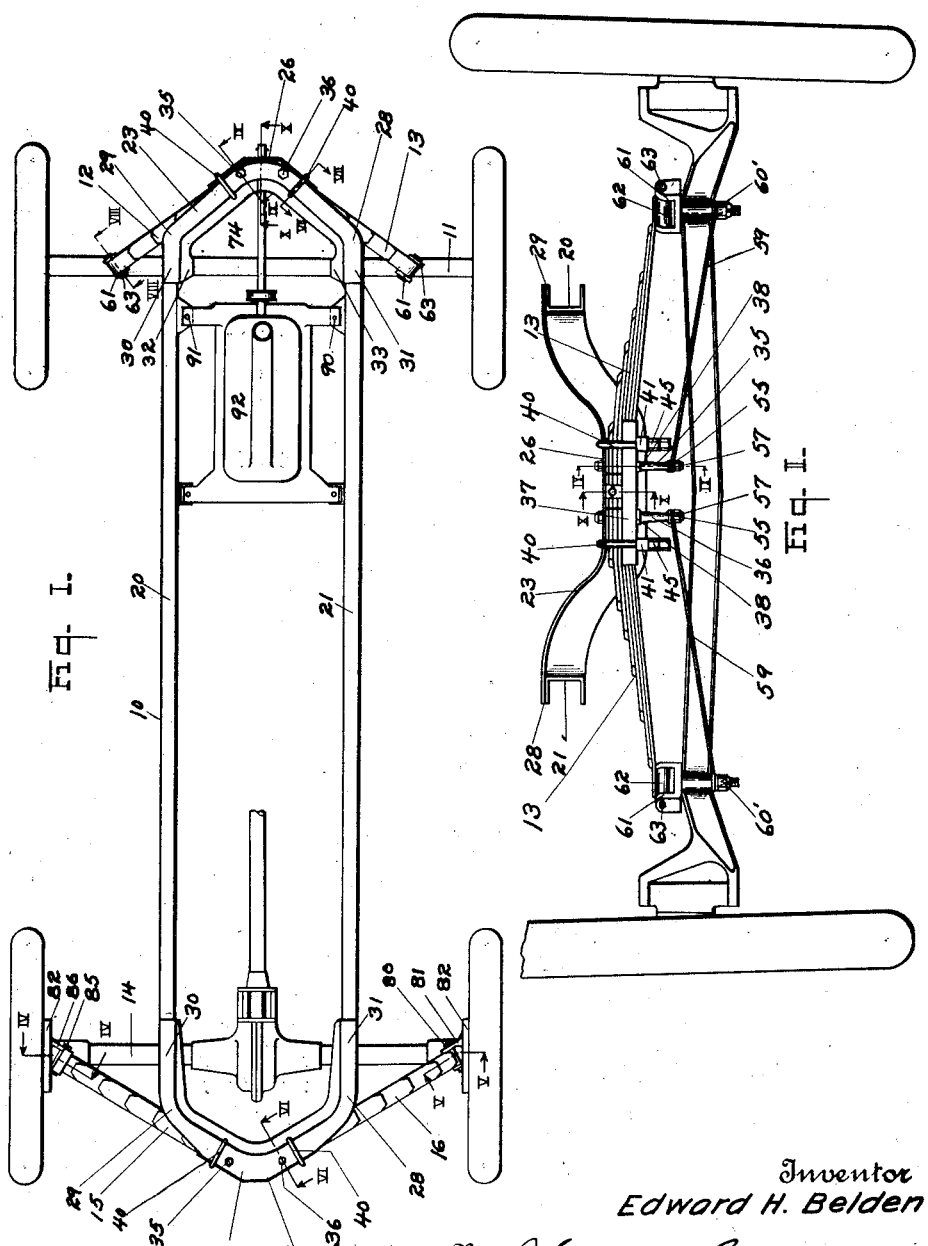

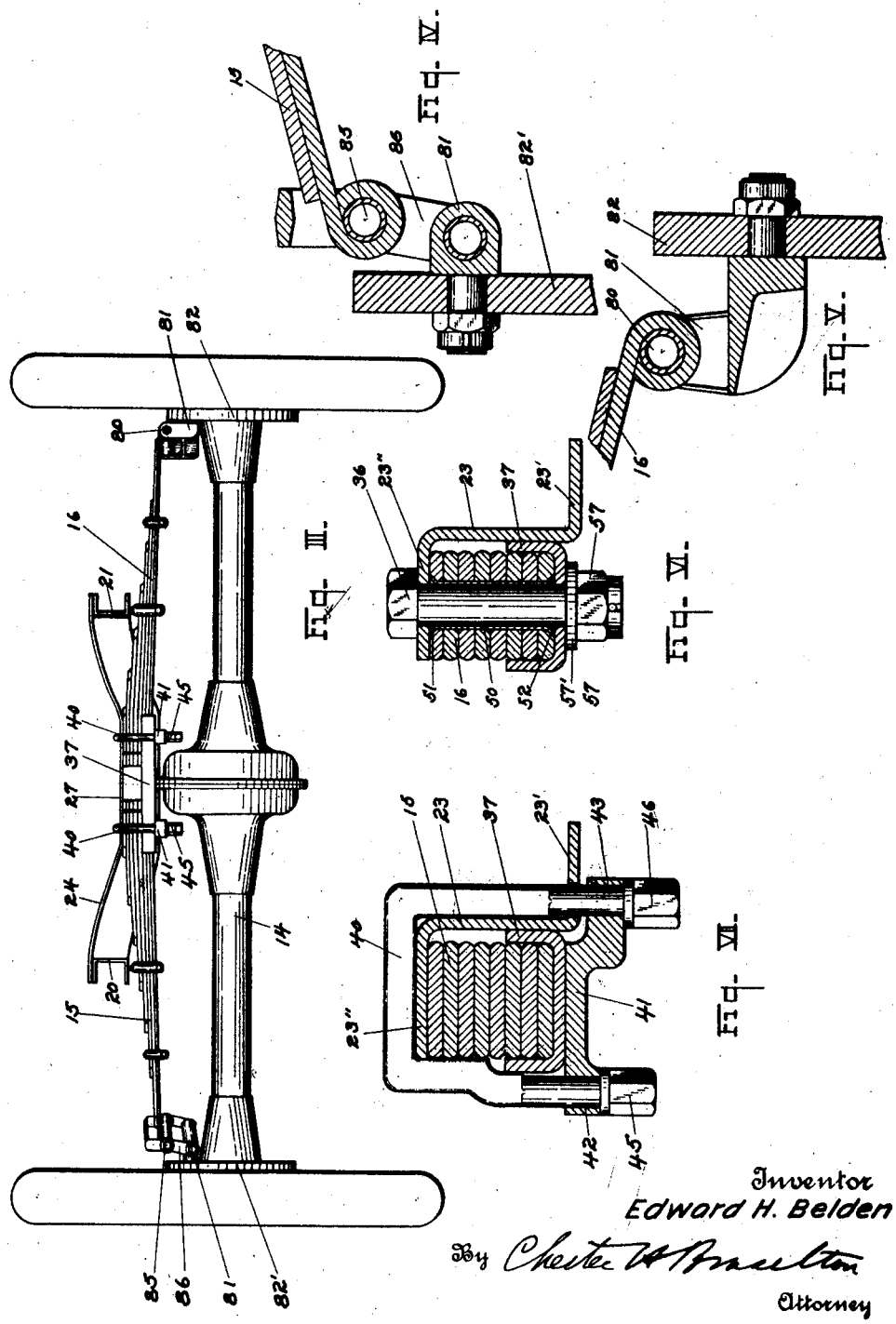

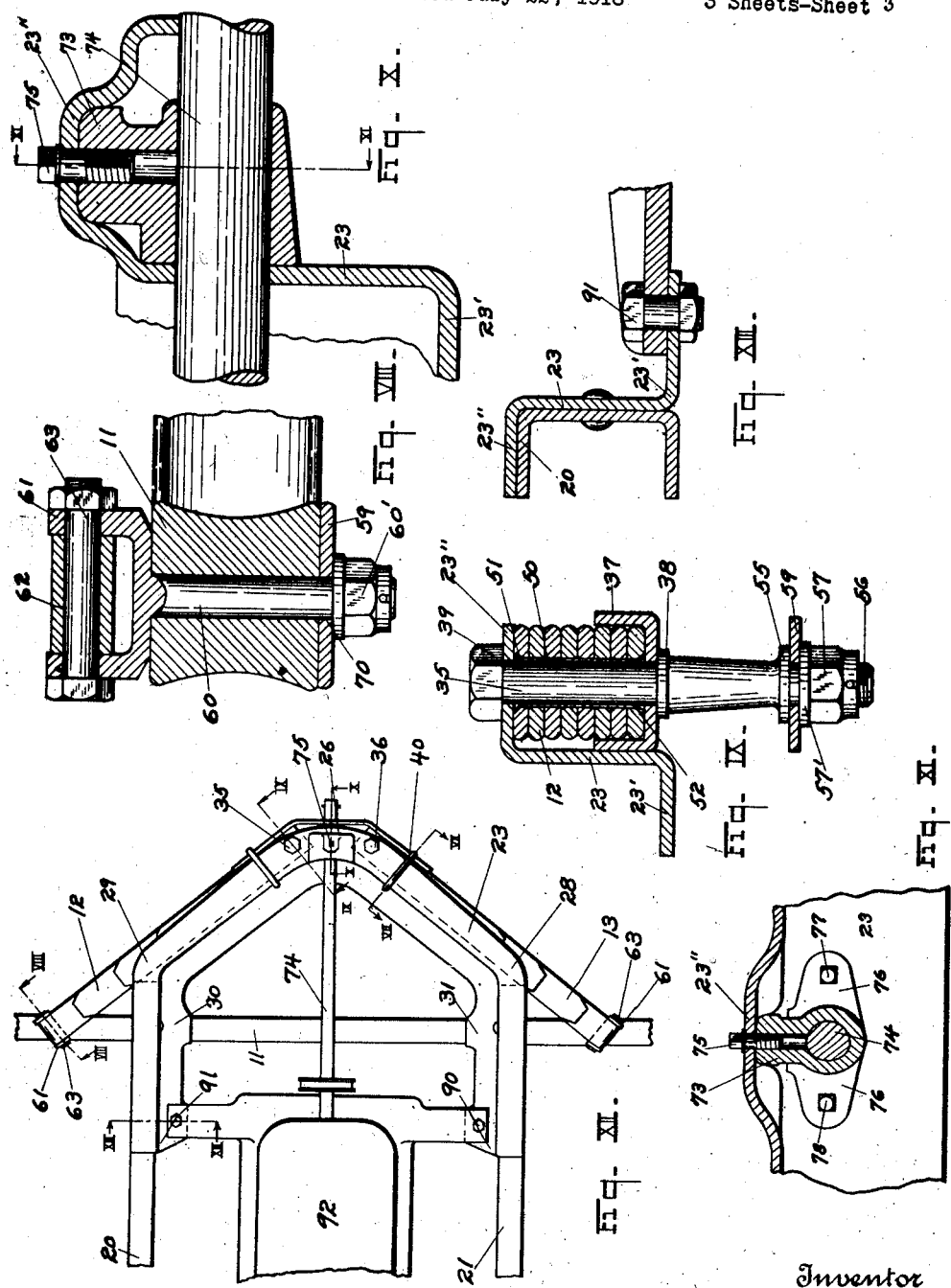

1,478,373

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

FRAME CONSTRUCTION.

Application filed July 22, 1918. Serial No. 246,206.

*To all whom it may concern:*

Be it known that I, EDWARD H. BELDEN, a citizen of the United States, residing at Toledo, in the county of Lucas and State of Ohio, have invented certain new and useful Improvements in Frame Constructions, of which I declare the following to be a full, clear, and exact description.

This invention relates to an improved type of frame construction for a vehicle chassis, having particular utility in connection with, although not limited to, that type of vehicle frame and suspension in which the frame extends forwardly or rearwardly beyond the front and rear axles of the vehicle and is supported by springs connected to the frame centrally thereof at the forward and rear extremities.

Where the side channel bars of the frame are extended past the axles of the vehicle and are made to converge one toward the other, as well as bent downwardly at the end extensions, considerable difficulty has been experienced in stamping the side bars into the proper shape desired. One of the objects of this invention is to provide a construction which will overcome this difficulty and which will permit the side bars to be made substantially straight and of any length and cross-sectional size, while separate standard extension units, capable of being properly bent and shaped as desired, are constructed and adapted for use with any length of side bar members. By this arrangement the manufacture of the frame is greatly facilitated, the cost of production materially decreased and the construction resulting therefrom has been found particularly efficient for the purposes intended, capable of being so made as to present further advantages herein below more specifically set forth.

Further objects of this invention are to provide a construction in a vehicle frame of the type indicated, which, when bent into the proper shape desired, will avoid the tendency in prior constructions to weaken the structure produced; to provide a frame construction for vehicles, having an element thereof of such transverse configuration as to greatly facilitate the assembly of the frame to the chassis, particularly the manner in which the suspension springs are secured to the frame, the portion of the frame referred to being so constructed as to also form means for supporting, for example, the radiator of a motor vehicle, the motor supports and the cranking shaft.

Further objects of this invention relate to the details of construction, arrangement of parts and association of elements disclosed herein, one feature of which provides means for securely retaining in proper position the various leaves of the springs before assembly of the frame, springs and vehicle axles, having the result of greatly facilitating the assembly of the parts referred to. It is to be understood, however, that this invention comprehends broadly the provision of any construction in which the side bar members of a vehicle frame may be made independently of the end extensions thereof, so that each may be made separately under more efficient methods of manufacture and, moreover, when assembled, result in an improved type of construction.

The objects of this invention are attained, in one instance, by the means disclosed herein, but it is to be understood that this means is only illustrative of how the invention may be reduced to practice and that the means may be varied widely without departing from the spirit and scope of the invention.

Referring to the drawings, Figure I is a plan view of the construction embodying this invention.

Figure II is a front elevational view.

Figure III is a rear elevation of the arrangement shown in Figure I.

Figure IV is a sectional view on the line IV—IV of Figure I.

Figures V, VI, VII and VIII are sectional views on the lines V—V, VI—VI, VII—VII and VIII—VIII, respectively, of Figure I.

Figure IX is a sectional view on the line IX—IX of Figures I, II and XII.

Figure X is a sectional view on the line X—X of Figures I and XII.

Figure XI is a sectional view on the line XI—XI of Figure X.

Figure XII is a plan view of a slightly modified type of construction.

Figure XIII is a sectional view on the line XIII—XIII of Figure XII.

In the drawings, similar reference numerals refer to similar parts throughout the several views and the sectional views are taken looking in the direction of the little arrows at the ends of the section lines.

In the type of construction disclosed herein for illustration, there is provided a frame 10 supported on the front axle 11 by the springs 12 and 13 and on the rear axle 14 by the springs 15 and 16. The frame 10 includes a pair of side bars 20 and 21 which may be channel-shaped in cross-section, as clearly indicated in Figures II and III. The side bars may be made substantially straight at their ends and are made of a sufficient length to extend to any desired point adjacent the front axle 11 and the rear axle 14. The side bars 20 and 21 are connected at the ends thereof to the extension members 23 and 24, the extension member 23 being supported by the springs 12 and 13 and the extension member 24 being connected to the springs 15 and 16, as indicated in the drawings. By this construction it will be seen that the side bars 20 and 21 may be made of any desired lengths and their cross-sectional area between the ends thereof may be varied as desired, and a standard set of extension units 23 and 24 may be coupled with any length of side bars 20 and 21. Moreover, the side bars may be made substantially straight and the extension units curved, as desired, to give the proper shape to the completed frame, having the extension shown by the front and rear axles of the chassis and adapted to be connected and suspended from the springs in the manner shown in the drawings.

Referring to Figures I, II, III, VI and VII, it will be seen that the extension members 23 and 24 in the particular form illustrated herein, have a Z-shaped cross-sectional configuration, so that when these members are bent as at the curved central portions 26 and 27, as well as at the portions 28 and 29, the lower flange 23' of the Z-bar 23 is somewhat thickened and therefore the strength of the bar is in no way detracted from by the bending referred to, notwithstanding any tendency to extend the upper flange 23". It is likewise apparent that the original strength of the Z-bar 24 at the rear of the frame is maintained after the same is bent into the shape illustrated herein for connection with the side bars 20 and 21, it being understood in connection with both members 23 and 24 that the particular curvature shown in the drawings is in no way essential to the invention, it being apparent that the same may be bent in innumerable ways to form extension connecting elements for the side bars 20 and 21 of the frame 10. The members 23 and 24 may be secured to the members 20 and 21 by welding or riveting or by any other suitable means. Each of the members may therefore be provided with over-lapping extensions 30 and 31 with the top flange of the Z-shaped extension resting on the top channel of the side bars 20 and 21, the web portion of each of the Z-bars and channel bars being in contact, as suggested from Figures II and III.

The lower flange 23' of the front extension 23 may be provided adjacent the portions 30 and 31 thereof with lugs 32 and 33 adapted to form supports for the radiator of a motor vehicle, the frame construction constituting a part of this invention being particularly designed for use with motor vehicles.

Referring now to the method of supporting the front extension 23 of the frame 10 to the springs 12 and 13 and the manner of supporting the springs to the front axle 11, it will be seen from Figures I, II and IX that the springs 12 and 13 lie flush underneath the top flange 23", while bolts 35 and 36 pass through the flange and leaves of the spring as indicated. If desired, the springs 12 and 13 may be bridged adjacent the lowermost leaf thereof by a channel member 37, while the bolts 35 and 36 are provided with collars 38 to bear against the bottom of the channel 37. By binding the nut 39 on the bolts 35 and 36, it will thus be seen that the springs 12 and 13 are secured to the extension unit 23. However, an additional clamping yoke 40, such as that illustrated in Figure VII, may be used to securely maintain the frame 10 to the springs 12 and 13. Any suitable clamp may be used and in the form shown includes a base 41 provided with openings 42 and 43 for the reception of the terminals of the yoke 40, the nuts 45 and 46 being used to bind the base 41 against the connecting channel 37 and the yoke 40 against the flange 23" of the Z-bar 23, the leaves of the spring being located therebetween, as clearly shown in Figure VII.

Referring to Figure IX, it will be seen that a tubular sleeve 50 is located in the openings in the several leaves of the springs 12 and 13, the tube being provided with a swaged-over end 51 at the uppermost leaf of the spring and a similar flanged end 52 at the lowermost leaf thereof. This sleeve is inserted in the several openings in the leaves of the springs to maintain the same in proper position before the assembly of the extension 23 of the frame 10 thereto and the connection of the springs with the axle of the vehicle.

It will be noted that each of the bolts 35 and 36 are provided with extensions below the collars 38 and are provided with additional collars 55. The lower end of the bolts 35 and 36 are screw-threaded, as shown at 56, to receive a nut 57 adapted to clamp a spring plate 59 to each of the bolts 35 and 36 between the collars 55 and a washer 57' interposed between the plate 59 and the nut 57. This plate 59 is adapted to connect the lower end of the bolts 35 and 36 with the lower ends of the pivots for the springs 12 and 13 on the axle 11. The particular construction just described is merely shown by way of illustration of one means for efficiently locating a strengthening spring plate or bar 59, if such bar be used with the type of frame construction illustrated herein, it being evident that the spring plate may be omitted if desired and that the particular means disclosed for locating the plate 59 may be used with any type of frame other than that shown. The bar 59 prevents underturning of the front axle.

A suitable pivot for the springs 12 and 13 to the axle 11 is illustrated in Figure VIII, wherein is shown a stud 60 passing through the axle 11 and carrying at its upper end the yoke 61. The lower leaf of the springs 12 and 13 which may be provided with the usual eye 62 is located between the arms of the yoke 61 with the bolt 63 extending through the eye 62 and the yoke 61 forms an efficient pivot for the springs 12 and 13, as will be readily understood. The plate 59 may be provided with an opening 70 so as to pass the plate over the stud 60 and permit the nut 60' for the stud to bind the spring plate 50 in place.

Adjacent the central portion of the extension 23, the upper flange 23" of the Z-bar 23 may be bent in the manner indicated in Figure X to receive a bearing hub 73 for the cranking shaft 74, the extension 23 being located in such a plane that the shaft extends therethrough, as shown. The bearing hub 73 may be drawn firmly up against the flange 23" by the bolt 75, while the hub 73 may also be provided with oppositely extending ears 76 shown in Figure XI, bolted at 77 and 78 to the web portion of the Z-bar 23. The element 73 also stiffens the bar 23, as will be evident.

The rear extension unit 24 is secured to the springs 15 and 16 in substantially the same manner as that described in connection with the front extending member 23. The method of securing the springs 15 and 16 to the rear axle of the chassis is illustrated in Figures III, V and VI, where it will be seen that the spring 16 is pivoted at 80 to a bracket 81 extending from the face plate 82 of the bearing hub at the right end of the rear axle, as viewed in Figure III, while the spring 15 is connected by the pivot 85 to a link 86 which is pivoted to a bracket 81 on the opposite face plate 82' of the opposite bearing hub.

By this construction referred to, a certain amount of lateral freedom between the frame 10 and the axle is provided, yet an undue movement in a lateral direction between these two elements is prevented by the construction illustrated.

Referring to Figure XII, it will be seen that the extensions 30 and 31 of the unit 23 are made somewhat longer than those shown in Figure I and the lower flange 23' of the Z-bar is provided with additional lugs 90 and 91 to form means for supporting the base frame of the motor 92 of the vehicle, it being seen by a reference to Figure I that in this case the motor 92 is supported by lugs on the side bars 20 and 21.

The operation of this invention and the method of assembling the construction provided thereby will, it is believed, be understood from the foregoing description. By use of the separate extension ends 23 and 24, the side bars 20 and 21 may be readily shaped and made of any length desired with any size of cross-section, it being usual, however, that the cross-sectional areas of the ends of the side bars 20 and 21 are the same regardless of the length of the frame. Various sized side bars and common standard end extensions the same size for all lengths of frame may therefore be separately made in large quantities, under standardized manufacturing methods, to produce frames for chassis of differing lengths of wheel base. Moreover, the bending of the extensions 23 and 24 is greatly facilitated by reason of the fact that these are separate short members and not part of the side frames 20 and 21, while by use of a Z-bar construction in place of a channel-shaped arrangement, (such as would be the case, for example, where the extension is composed of the same material as the side bars 20 and 21), the weakening caused by bending channel members so as to extend the flange thereof, is avoided, since the lower flange 23' of the Z-bar is substantially thickened. The springs both at the front and rear of the chassis may be more readily secured to the Z-bar in view of the absence of the lower flange between which the several leaves of the springs must be located, this construction presenting the two-fold advantage of eliminating the necessity of any filler should the total thickness of the springs not equal the distance between the flanges of the channel and permits of the use of heavier springs whose thickness, due to the number of leaves used, exceeds the height of the web portion of the Z-bar. In addition thereto, the Z-bar construction for the extension members presents a flange upon which, or extensions thereof, the radiator of the automobile may be supported, as shown by the form of extension shown in both Figures I and XII, while in Figure XII the lower flange of the Z-bar may also form a ledge for supporting the base frame of the motor.

Attention is also called to the use of the sleeve 50 for binding the several leaves of the springs in position before assembly to the extensions on the frame 10 by means of the bolts 35 and 36, which has the result of greatly facilitating the assembly, as hereinbefore indicated. This invention, while particularly useful in connection with the type of improved spring suspension illustrated herein, is not limited thereto but contemplates more broadly the construction of frame with separate extension members which are bent in planes differing from the planes in which the side bars of the frame are located, so that each of the elements of all sizes of frame construction may be more efficiently manufactured, it being understood, however, that the particular forms of construction described herein in detail have been found particularly efficient with the type of extended frame and spring suspension illustrated, in which a relatively short wheel base may be used and the vehicle provided with easy riding qualities of a longer wheel base, at the same time permitting the use of a longer and roomier body.

Having thus described my invention, what I claim as new and desire to secure by Letters Patent, is:

1. In a motor vehicle, substantially straight frame side bars, separate integral members for joining said side bars at front and rear, said members having ends extending longitudinally of the vehicle overlying and secured to the ends of the side bars, the intermediate portions of said members converging toward the longitudinal median line of the vehicle beyond the ends of the side bars, and a spring fixed at one end to each of said intermediate portions to extend in the same general direction thereof.

2. In a frame construction, the combination of a pair of side frame members, a pair of extension and connecting members located at either end of said side frame members, and springs connected to said extension members for supporting said frame to the axles of a vehicle chassis, said extension members being Z-shaped in cross-sectional configuration to provide a single flange against which said springs may be located.

3. In a vehicle chassis construction, a frame, comprising a plurality of side bars extending from the front to the rear axle of said chassis, and an extension and connecting member located at the end of said side bars adapted to form means to support said frame by a spring suspension to said axles, said extension members being Z-shaped in cross-sectional configuration, having portions adapted to be secured to said side bars and bent to form an integral connection and longitudinal extension for said frame.

4. In a vehicle chassis construction, a frame, comprising a plurality of side bars extending from the front to the rear axle of said chassis, and an extension and connecting member located at one end of said side bars adapted to form means to support said frame by a spring suspension to one of said axles, said extension member being Z-shaped in cross-sectional configuration, having portions adapted to be secured to said side bars and bent to form an integral connection and longitudinal extension for said frame, one of the flanges of said Z-shaped extension member adapted to form means to support the radiator of a motor vehicle.

5. In a vehicle chassis construction, a frame, comprising a plurality of side bars extending from the front to the rear axle of said chassis, and an extension and connecting member located at the end of said side bars adapted to form means to support said frame by a spring suspension to one of said axles, said extension member being Z-shaped in cross-sectional configuration, having portions adapted to be secured to said side bars and bent to form an integral connection and longitudinal extension for said frame, one of the flanges of said Z-shaped extension member adapted to form means to support the radiator of a motor vehicle, and the base frame of the motor thereof.

6. In a vehicle, a frame having a Z-shaped connecting member for the side bars of said frame, springs for suspending said frame to the axle of the vehicle, said springs being connected to one of the flanges of said Z-shaped member, the other of said flanges adapted to support part of the power plant of the motor for the vehicle.

7. In a vehicle, the combination of a frame provided with an end connecting member Z-shaped in cross-sectional configuration, a pair of cantilever springs for said member adapted to be secured at one end to one of the flanges of said Z-shaped member and pivoted at the other end to an axle of the vehicle, and a channel-shaped member connecting said springs adjacent their point of connection with said Z-shaped member.

8. Means for securing a vehicle frame having a flanged member to a spring suspension therefor, including a bolt passing through said flange and the leaves of said spring, a collar on said bolt, a spring retaining and supporting member interposed between said spring and said collar, and means associated with the bolt for binding together the flange of said member, the leaves of said spring and said spring supporting member.

9. In a vehicle chassis construction, the combination of a vehicle frame having a flanged connecting member for the side bars thereof, a pair of cantilever springs connected to said connecting member at one end and pivoted at the other end to an axle of the vehicle at the top side thereof, and a pair of flexible stay plates connected to said axle adjacent the lower side thereof and to said connecting member adjacent the point of connection of said springs therewith.

10. In a vehicle chassis construction, the combination of a vehicle frame having a flanged connecting member, an extension member extending beyond the axles of the vehicle, a pair of cantilever springs connected to said connecting member at one end and pivoted at the other end to an axle of the vehicle at the top side thereof, and a flexible stay plate connected to said axle adjacent the lower side thereof and to said connecting member adjacent the point of connection of said springs therewith.

11. In a vehicle frame construction, a unitary transversely extending connecting member for the side bars of said frame, said member, being Z-shaped in cross-section and having a web portion and a flanged portion, and means for connecting said web with said flange to stiffen said connecting member.

12. In a vehicle frame construction, a unitary transversely extending connecting member for the side bars of said frame, said member having a web portion and a flanged portion, and means for connecting the portion of said web with said flange to stiffen said connecting member, said means also forming a bearing hub for an extended cranking shaft on the engine of the vehicle.

13. In a vehicle frame construction, the combination of a pair of side bars and a pair of connecting members located at each end of said side bars to connect the same, said connecting members having a web portion and a flanged portion, and means located substantially centrally of said connecting members for joining the web and flange portions thereof, said means including extension lugs adapted to be secured to the face of said web portion, and a projecting portion secured to the flange portion of said connecting member.

14. In a vehicle frame construction, the combination of a pair of side bars and a pair of connecting members located at each end of said side bars to connect the same, said connecting members having a web portion and a flanged portion, and means located substantially centrally of said connecting members for joining the web and flange portions thereof, said means being provided with a central opening adapted to form a bearing for the cranking shaft of the motor vehicle.

15. In a vehicle chassis construction, a frame, comprising a plurality of side bars extending from the front to the rear axle of said chassis, and an extension and connecting member located at one end of said side bars adapted to form means to support said frame by a spring suspension to one of said axles, said extension member being Z-shaped in cross-sectional configuration, having portions adapted to be secured to said side bars and bent to form an integral connection and longitudinal extension for said frame, one of the flanges of said Z-shaped extension member adapted to form means to support part of the power plant of a motor vehicle.

16. In a vehicle, the combination of a frame having an extension and connecting member adjacent the axle of the vehicle, a pair of springs connected at one end to the axle of the vehicle and at the other end to said extension member, means for connecting said springs adjacent their point of connection with said extension member, and means on said extension member for supporting part of the power plant of the motor vehicle.

17. In a vehicle, the combination of a frame having an extension and connecting member adjacent the axle of the vehicle, a pair of springs connected at one end to the axle of the vehicle and at the other end to said extension member, and a channel shaped member for connecting said springs adjacent their point of connection with said extension member.

18. In a vehicle chassis, a frame comprising a pair of substantially straight side bars and an end member, said end member having diverging portions terminating in parallel ends secured to the corresponding ends of said side bars, and a cantilever spring fixed to each of said diverging portions.

19. In a vehicle chassis, a frame comprising a pair of substantially straight side bars and an end member, said end member having a pair of diverging portions terminating in parallel end portions rigidly secured to said side bars, and a pair of diverging cantilever springs each fixed to one of the diverging portions of said end member.

20. In a vehicle chassis, the combination of a pair of spaced substantially straight side bars, an integral member having spaced, straight end portions, each secured to an end of said side bars, and having diverging intermediate portions, said diverging intermediate portions each comprising a horizontally extending flange, and a pair of diverging cantilever springs secured to said flanges.

21. In a vehicle chassis, the combination of a pair of spaced side bars, an integral connecting member therefor having its ends secured to said side bars and having diverging intermediate portions beyond the ends of said side bars, said diverging portions each comprising a vertical side and an overhanging flange, a cantilever spring for each of said portions arranged in the angle formed by said side and flange, and means for rigidly securing said springs to said flanges.

22. In a vehicle chassis, a pair of substantially straight side bars, a transverse axle arranged adjacent the ends of said side bars, an end connecting member for said side bars comprising diverging portions, and a pair of diverging springs having their outer ends attached to said axle and having their inner ends fixed to the diverging portions of said connecting member.

In testimony whereof, I affix my signature.

EDWARD H. BELDEN.